United States Patent [19]

Clark et al.

[11] Patent Number: 4,466,715
[45] Date of Patent: Aug. 21, 1984

[54] IMAGE PROJECTOR WITH DOUBLE TERMINAL LAMP FIXTURE

[76] Inventors: Douglas Clark, 29 Shady Hollow, Dearborn, Mich. 48124; Victor Overby, 1916 N. Walton, Westland, Mich. 48185

[21] Appl. No.: 427,746

[22] Filed: Sep. 29, 1982

[51] Int. Cl.³ .............................................. G03B 21/56
[52] U.S. Cl. ...................................... 353/45; 362/226
[58] Field of Search ...................... 353/45, 57, 58, 85, 353/DIG. 3, 87, 60, 61; 362/226, 396, 217, 218, 432, 294

[56] References Cited

U.S. PATENT DOCUMENTS

| | | | |
|---|---|---|---|
| 1,137,773 | 5/1915 | Marsden | 362/226 |
| 2,122,848 | 7/1938 | Stearns | 362/226 X |
| 2,384,956 | 9/1945 | Mueller et al. | |
| 2,413,628 | 12/1946 | Hinds | |
| 3,097,903 | 7/1963 | Moore | 362/217 X |
| 3,269,258 | 8/1966 | Byrd et al. | 353/45 |
| 3,353,140 | 11/1967 | Johnson | |
| 3,686,529 | 8/1972 | Boland | 362/218 X |
| 4,025,779 | 5/1977 | Ahroni | 362/294 X |
| 4,084,873 | 4/1978 | Grate | |
| 4,184,755 | 1/1980 | Burgess et al. | |

FOREIGN PATENT DOCUMENTS 957160  5/1964  United Kingdom ................ 362/226

*Primary Examiner*—Harry N. Haroian
*Attorney, Agent, or Firm*—Steven L. Permut

[57] ABSTRACT

A lamp assembly (16) mounted to an interior frame (14) of a bowling alley score projector (10). The lamp assembly (16) includes a U-shaped bracket (34) having two end portions mounting two lamp holders (44). Lamp holders (44) have housings (46) receiving coil springs (54) which spring bias sockets (48). The sockets (48) are spring biased against terminals (60) of a dual terminal quartz-halogen light bulb (50). A center bight section (40) forming a U-shaped bracket is connected to a spacer (38) which is in turn removeably secured to an arm (32) of interior frame (14).

5 Claims, 5 Drawing Figures

U.S. Patent   Aug. 21, 1984   Sheet 1 of 2   4,466,715
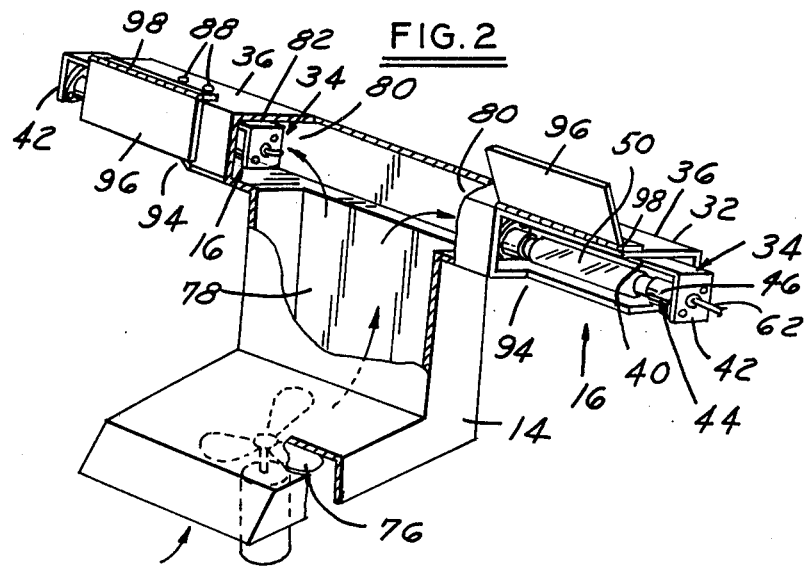
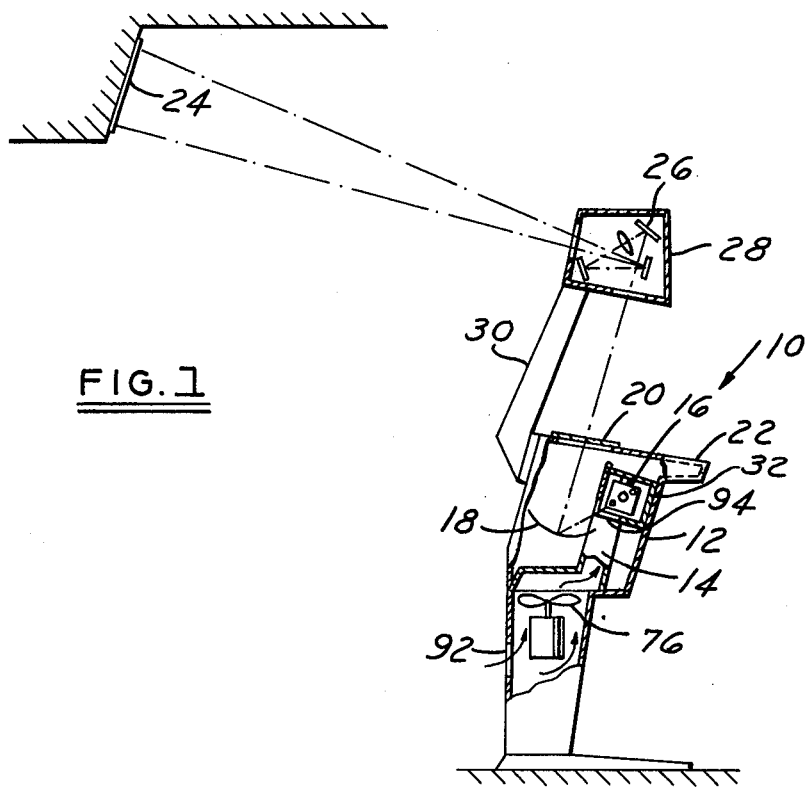

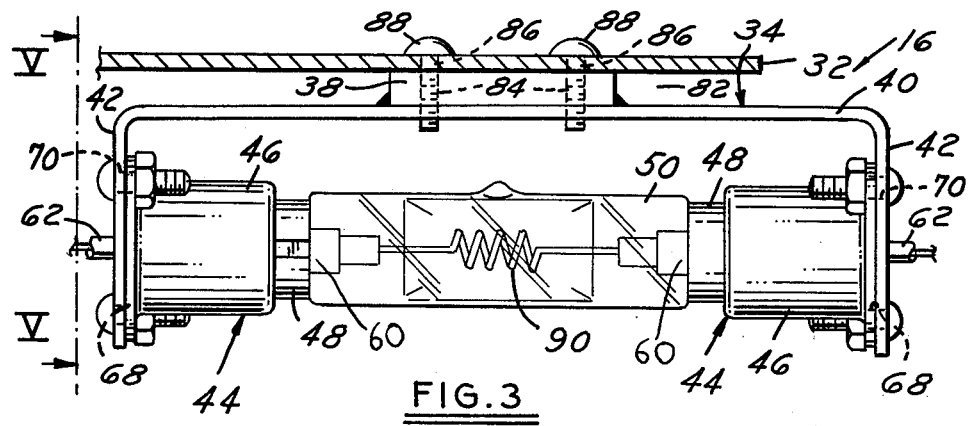
FIG. 3
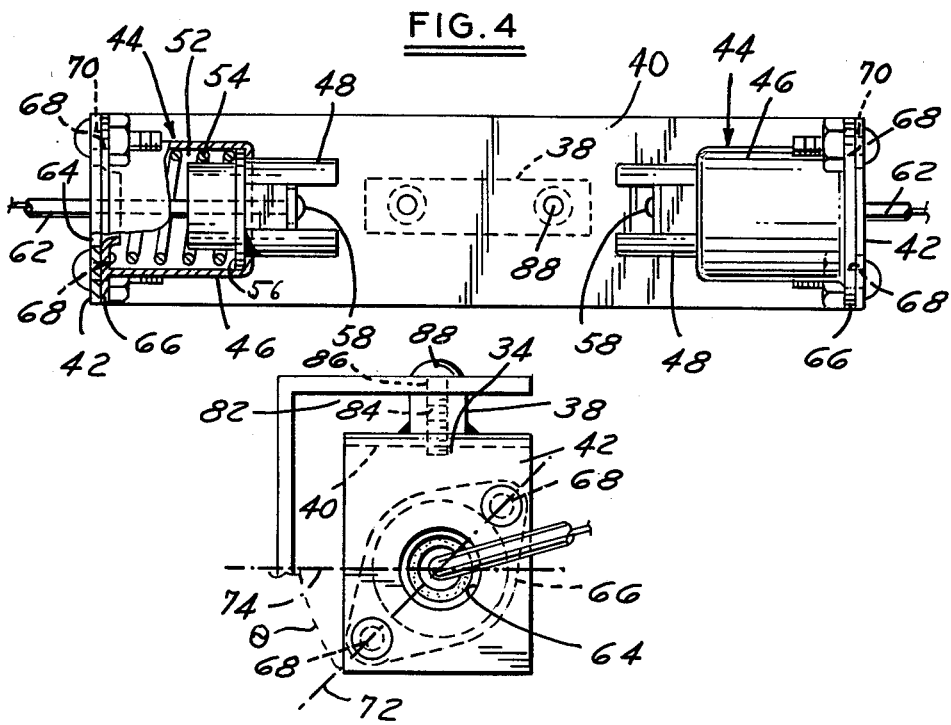
FIG. 4
FIG. 5

IMAGE PROJECTOR WITH DOUBLE TERMINAL LAMP FIXTURE

TECHNICAL FIELD

This invention relates to image projectors, and more particularly to a bowling alley score projector having a light source within a table like housing for projecting an image onto a remote screen.

BACKGROUND DISCLOSURE INFORMATION

Bowling alley score projectors commonly have double terminal quartz-halogen lamps as a light source. The quartz-halogen lamp fits in a light fixture that is bolted onto an interior frame within a score projector housing. The light fixture sockets include metal leaf springs that are biased against the terminal ends of the lamp. The leaf spring has a nodule to assure contact with an electrical contact recessed in a porcelain terminal end of the quartz-halogen lamp. A cooling fan within the housing blows air through the bracket assembly which has cooling fins to cool the lamp.

If the leaf spring does not securely contact the terminal ends of the lamp, electrical sparking may deteriorate the terminal ends of both the leaf spring and the terminal ends of the lamp. If deterioration occurs, the electrical circuit may be broken and the light bulb and the light fixture may have to be replaced. Besides the expense of the replacement parts, there is added expense for labor in replacing the parts. Furthermore, the score projector is inoperable until the parts are replaced.

A reliable and durable lamp fixture is needed for a bowling alley score projector that minimizes the necessity of replacing the lamp and the lamp fixture.

SUMMARY OF THE INVENTION

In accordance with the invention, the bowling alley score projector includes a writing surface and a transparent window section in the writing surface. A light source is mounted under the writing surface and a mirror directs the light up through the transparent section where it is redirected to a projection screen.

The score projector has an interior frame for mounting a light fixture. The light fixture includes a U-shaped bracket having two end sections and a central bight section. Two lamp holders are mounted on the end sections of the U-shaped bracket and oppose each other. Each lamp holder has a housing section containing a coil spring and a socket biased by the coil spring. The sockets are spring biased toward each other. A high intensity light source such as a quartz-halogen bulb is positioned between the sockets and secured to the sockets by the biasing force of the coil spring.

The ends of the bracket have cooling passageways therethrough for allowing the passage of cooling air. A fan or other means for causing a flow of air through the passageways is positioned in proximity to the interior frame to direct air flow through the frame, through the cooling passageways, and about the bracket, lamp holders, and light bulb.

In one embodiment, the bight section of the bracket has a spacer which spaces the major portion of the bracket away from the interior frame to form a gap therebetween. The gap allows air to flow against the backside of the bracket to further cool the bracket.

In broader terms, the invention relates to an image projection system having a frame with passage therethrough. A bracket is removeably secured to the frame. Two lamp holders are secured to the bracket opposing each other for receiving a high intensity light source. The light source has two terminal ends engaging the respective lamp holders. Each lamp holder has a housing section receiving a coil spring. The coil spring biases a socket into contact with a respective terminal end of the high intensity source. A blower is mounted in proximity to the passage through the frame for blowing air through the passage and directing the air about the bracket, the lamp holders, and the high intensity light source.

BRIEF DESCRIPTION OF THE DRAWINGS

Reference will now be made to the accompanying drawings in which:

FIG. 1 is a schematic side elevational and partially segmented view of a bowling alley score projector utilizing one embodiment of the invention;

FIG. 2 is a perspective and partially broken view showing the interior frame shown in FIG. 1 and a lamp assembly according to the invention;

FIG. 3 is a side elevational view of the lamp assembly shown in FIGS. 1 and 2;

FIG. 4 is a plan view of the lamp assembly shown in FIG. 3; and

FIG. 5 is an end elevational view taken along the line V—V shown in FIG. 3.

DETAILED DESCRIPTION OF THE PREFERRED EMBODIMENT

Referring to FIG. 1, a bowling alley score projector has a lower housing 12 which mounts an interior frame 14. The interior frame mounts a lamp assembly 16. The lamp assembly 16 has its light directed downward through an opening 94 in frame 14. The light is reflected upward by a concave mirror 18 through a window section 20 in a table top 22 of the lower housing 12. The light is redirected to a screen 24 by an optical system 26 mounted within an upper housing 28 that is attached to the lower housing 12 by a stem 30.

Referring to FIGS. 2 and 3, lamp assembly 16 is attached to each laterally extending arm 32. The U-shaped bracket 34 is attached to the upper surface 36 of the frame 32. The U-shaped bracket 34 has a spacer block 38 secured thereto which spaces a bight section 40 of bracket 34 away from the wall 36 of the frame 32. The bracket 34 has end sections 42 downwardly extending from its bight section 42. A lamp holder 44 is secured to each end section 42. Each lamp holder 44 has a housing section 46 in a socket 48. A double terminal quartz-halogen light bulb 50 is received in the sockets 48. Each terminal portion 60 has a porcelain outer shell insulating an electrical contact in electrical contact with filament 90.

Referring to FIG. 4, each lamp holder 44 has a housing section 46 having a central bore 52 sized to receive a coil spring 54. The socket 48 has a flange 56 which abuts the end of coil spring 54. Consequently, the socket 48 is biased by the coil spring toward the center of the bracket 34. The socket 48 has a silver contact 58 which contacts the terminal portions 60 of bulb 50. The silver contact 58 is electrically connected to an asbestos wrapped silicone coated wire 62. The wire 62 passes through the bore 52 of housing 46 and an aperture 64 in end section 42.

Referring to FIG. 5, the housing 44 has an outer extending flange 66 having two apertures 68 therethrough. The apertures 68 are on radial opposite sides of the housing and are positioned to be aligned with two apertures 70 in the end 42, shown more clearly in FIG. 4. The apertures 70 and apertures 68 form an axis indicated as 72 which is canted with respect to a transverse axis 74 to form an angle indicated as θ. Canting of the axis 72 formed by the apertures 68 and 70 reduces the necessary width of end 42 in order to mount the housing 44.

Insertion of the light bulb 50 into the sockets 48 causes the sockets 48 to compress the coil springs such that the coil springs exert a reactive force onto the socket which in turn pushes the silver contact 58 into the terminal portion 60 of light bulb 50. It has been found that the force of coil spring 54 pressing the silver contact 58 into the terminal portion 60 of the light bulb 50 prevents electrical arcing and high heat generated by the electrical arcing. The elimination of arcing extends the life of the terminal 60 of the light bulb and the contact 58. The porcelain material of terminal 60 does not crack or otherwise deteriorate due to intense heat. In addition, filament 90 near terminal section 60 also sees extended life due to the lack of intense heat.

When the light bulb is actuated, a fan 76 positioned below the frame 14 is also actuated. Air from vent 92 is forced by the fan 76 to pass through an air passage 78 and through two branches 80 of arms 32. The air passes through the aperture 64 in each end 42 and also as shown in FIG. 3 through a gap 82 formed between the bight section 34 and the upper surface 36 of the extending arm 32. The air passes around the lamp holders 44 and the light bulb 50 to take away the heat generated by the light bulb 50.

The bracket 34 and spacer 38 are made from metal and act as a heatsink to draw away the initial heat genejɨed by the light bulb 50. The gap 82 and the positioning of the bracket longitudinally within the passage 80 provide for the air flow to surround the bracket 34 from the lamp holders 44 and the light bulb 50 to draw away sufficient amount of heat to prevent overheating of the lamp assembly 16.

The lamp assembly 16 can be a direct substitute for present day lamp assembly which uses the leaf spring clips. The spacer block 38 of bracket 34 has threaded apertures 84 therethrough which are positioned to be aligned with the existing apertures 86 in the upper surface 36 of the arm 32. Bolts 88 extend through holes 86 and threadably engage the apertures 84 to hold the bracket 34 in place within the arm 32.

If per chance replacement of the bracket 34 or the light bulb 50 is necessary, easy access is provided by the axis panel 88 mounted on the upper surface 36 of the arm being pivoted to the upper position which is shown in FIG. 2. The light bulb 50 and the bracket 34 become exposed for easy access.

Incorporation of the above described lamp assembly 16 within a score projector reduces lamp burnout. The porcelain terminals 60 of the lamp 50 by being in pressured contact with the silver contact 58 of the socket 48 see no arcing and therefore no high heat is generated which may cause the porcelain terminals to crack or otherwise deteriorate. In addition, the filament 90 also sees increased life. The alignment of the apertures 64 in the direction of the air flow from the fan to the passages 80 allows air to pass therethrough and to constantly take away any excess heat buildup generated by the light bulb. In this fashion, a lamp assembly reduces the replacement and labor costs and provides for a more reliable score projector.

Variation and modifications of the present invention are possible without departing from its spirit and scope as defined by the appended claims.

The embodiments in which an exclusive property or privilege is claimed are defined as follows:

1. A bowling alley score projector including a writing surface, a transparent section in said writing surface, a light source mounted under said writing surface and means for directing light up through said transparent section, and means for directing said light to a screen, said score projector characterized by:
   an interior frame positioned below said writing surface;
   a one piece U-bracket having two end sections and a bight section removeably connected to said frame;
   a lamp holder mounted on each end of said U-bracket and opposing each other for receiving a high intensity light bulb having a terminal at each end thereof;
   each lamp holder having a housing section containing a coil spring and a socket being spring biased by said coil spring;
   said housing section mounted to said ends of said U-bracket and each socket being spring biased toward each other;
   said coil spring in each lamp holder spring biases the socket against a complementary terminal of said light bulb whereby contact between the socket and terminal of the light bulb is assured;
   said ends of said bracket having cooling passage means for passing cooling air therethrough; and
   means for flowing air through said cooling passage means and about said bulb and U-bracket for cooling said bracket, lampholders, and bulb.

2. A score projector as defined in claim 1 wherein said bight section has a spacer for spacing said bight from said frame and allowing passage of air between said frame and said bight section.

3. A score projector as defined in claim 1 wherein;
   said housing section has mounting flanges on radially opposite ends;
   each flange has a hole for receiving a fastener;
   said ends of said U-bracket having holes for receiving said fastener;
   said holes in said ends forming an axis canted with respect to a transverse axis of said end for reducing the necessary width of said ends; and
   said holes of said housing section and said end being aligned to receive said fastener whereby said lamp holders are attached to said ends.

4. A score projector as defined in claim 1 wherein;
   said passage means includes an aperture through each end of said U-bracket;
   said aperture aligned with a central bore in said housing section; and
   a socket connected to an insulated electric wire passing through said bore and said aperture.

5. A lamp assembly for a projector, said lamp assembly characterized by;
   a U-shaped bracket having two end sections and a bight section;
   a pair of lamp holders mounted to the end section;
   each of said lamp holders having a cylindrical housing section with a central bore and a socket;
   a coil spring received in said central bore, said coil spring for spring biasing said socket;

said socket of each lamp holder biased toward each other for frictionally engaging a high intensity light bulb;

said housing section has mounting flanges on radially opposite ends;

said ends of said U-shaped bracket has means for mounting said flanges thereto; and said mounting means aligned on an axis that is canted with respect to an axis extending along and defining the width of said end for reducing the necessary width of said ends.

* * * * *